United States Patent
Ozeki et al.

(10) Patent No.: US 7,006,207 B2
(45) Date of Patent: Feb. 28, 2006

(54) POLARIZATION MODE DISPERSION MEASURING DEVICE, METHOD, RECORDING MEDIUM

(75) Inventors: Takeshi Ozeki, Saitama (JP); Tomoyu Yamashita, Saitama (JP); Motoki Imamura, Saitama (JP)

(73) Assignee: Advantest Corporation, Tokyo (JP)

( * ) Notice: Subject to any disclaimer, the term of this patent is extended or adjusted under 35 U.S.C. 154(b) by 40 days.

(21) Appl. No.: 10/491,787

(22) PCT Filed: Oct. 9, 2002

(86) PCT No.: PCT/JP02/10468

§ 371 (c)(1),
(2), (4) Date: Oct. 29, 2004

(87) PCT Pub. No.: WO03/034020

PCT Pub. Date: Apr. 24, 2003

(65) Prior Publication Data

US 2005/0052638 A1 Mar. 10, 2005

(30) Foreign Application Priority Data

Oct. 12, 2001 (JP) ............................. 2001-315313

(51) Int. Cl.
*G01N 21/00* (2006.01)

(52) U.S. Cl. .................................. 356/73.1

(58) Field of Classification Search ............... 356/73.1; 398/141–148, 119, 192, 29, 81; 385/142–144, 385/123–127, 37, 12; 250/227.12–227.14
See application file for complete search history.

(56) References Cited

U.S. PATENT DOCUMENTS 6,362,874 B1 * 3/2002 Madsen ..................... 356/73.1
6,519,027 B1 * 2/2003 Gordon et al. ............. 356/73.1
6,586,724 B1 * 7/2003 Graves .................. 250/227.23

FOREIGN PATENT DOCUMENTS

JP 9-72827 A 3/1997
JP 9-264814 A 7/1997

* cited by examiner

*Primary Examiner*—Tu T. Nguyen
(74) *Attorney, Agent, or Firm*—Lowe Hauptman & Berner, LLP (57) ABSTRACT

A device for measuring $\tau_{PMD}$ includes a polarization controller (12) that allows first (second) incident light, in a synthetic incident light to an object to be measured (30), to be in line with a p-polarization (s-polarization) axis in a polarization separator (16). The phase shift equivalent value (optical angle frequency differentiation) and amplitude equivalent value (square value) of a first (second) incident light component in an output from the polarization separator (16) measured by a first (second) measuring unit (20a, 20b) are respectively the phase shift equivalent value and amplitude equivalent value of a first column $T_{11}$, $T_{21}$ (second column $T_{12}$, $T_{22}$) when the transfer function matrix of the object (30) is a 2×2 matrix to thereby allow a control unit (2) to determine the polarization mode dispersion $\tau_{PMD}$ of the object (30).

11 Claims, 3 Drawing Sheets

POLARIZATION MODE DISPERSION MEASURING DEVICE, METHOD, RECORDING MEDIUM

TECHNICAL FIELD

The present invention relates to measurement of a polarization mode dispersion of optical fibers and optical components used for optical communication.

BACKGROUND ART

Figure 3:
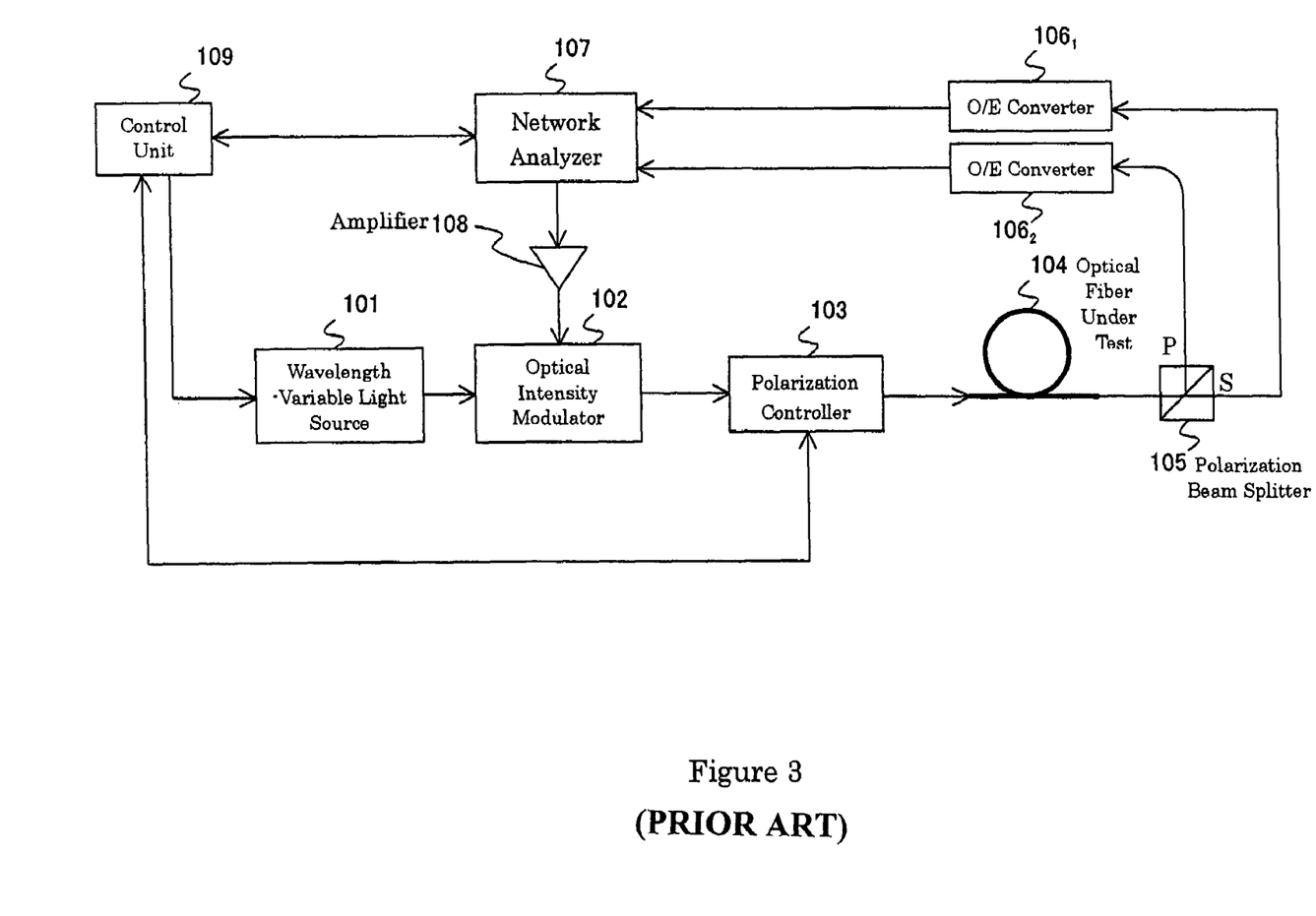
FIG. 3 is a block diagram showing the device for measuring the polarization mode dispersion of optical fibers according to Japanese Patent Laid-Open Publication (Kokai) No. H09-264814

Measurement of a polarization mode dispersion of optical fibers has been carried out conventionally. For example, Japanese Patent Laid-Open Publication (Kokai) No. H09-264814 describes a polarization mode dispersion measuring device for optical fibers. With reference to FIG. 3, a description will now be given of the device for measuring the polarization mode dispersion of optical fibers according to Japanese Patent Laid-Open Publication (Kokai) No. H09-264814.

First, the polarization mode dispersion $\tau_{PMD}$ of an optical fiber under test 104 is defined by the following equation (1):

$$\tau_{PMD} = 2\sqrt{\theta^2 + \psi_1^2 \cos^2\theta + \psi_2^2 \sin^2\theta} \quad (1)$$

where $\theta$ is a polarization angle, $\psi_1$ is a phase shift in a certain direction on a plane perpendicular to the propagation direction of light, and $\psi_2$ is a phase shift in a direction orthogonal to $\psi_1$. On this occasion, a transfer function matrix [T] of the optical fiber under test 104 is defined by the following equation (2):

$$[T(\omega)] = \begin{bmatrix} |T_{11}|e^{-j\phi_{11}} & |T_{12}|e^{-j\phi_{12}} \\ |T_{21}|e^{-j\phi_{21}} & |T_{22}|e^{-j\phi_{22}} \end{bmatrix} \quad (2)$$

where $|Tij|$ is an amplitude of respective matrix elements, $\phi ij$ is a phase shift of the respective matrix elements, and both of them are functions of an optical angular frequency $\omega$. Then, the parameters $\theta$, $\psi_1$, and $\psi_2$ in the equation (1) are respectively obtained by the following equations (3), (4), and (5).

$$\theta(\omega) = 0.5 \cos^{-1}(|T_{11}|^2 - |T_{21}|^2) \quad (3)$$

$$\psi_1(\omega) = (\phi_{11} - \phi_{22})/2 \quad (4)$$

$$\psi_2(\omega) = (\phi_{21} - \phi_{12} + \pi)/2 \quad (5)$$

Consequently, the polarization mode dispersion $\tau_{PMD}$ of the optical fiber under test 104 is obtained by obtaining the transfer function matrix [T] of the optical fiber under test 104.

A description will now be given of how to obtain the transfer function matrix [T] of the optical fiber under test 104 with reference to FIG. 3. First, a control unit 109 makes output light of a polarization controller 103 as a linearly polarized wave in line with a p direction of a polarization beam splitter 105 incident to the optical fiber under test 104. On this occasion, output light from the optical fiber under test 104 is represented by the following equation (6).

$$\begin{bmatrix} |T_{11}|e^{-j\phi_{11}} & |T_{12}|e^{-j\phi_{12}} \\ |T_{21}|e^{-j\phi_{21}} & |T_{22}|e^{-j\phi_{22}} \end{bmatrix} \begin{bmatrix} 1 \\ 0 \end{bmatrix} = \begin{bmatrix} |T_{11}|e^{-j\phi_{11}} & (p\ 成分) \\ |T_{21}|e^{-j\phi_{21}} & (s\ 成分) \end{bmatrix} \quad (6)$$

The above-described output light is split into an s-polarization component and a p-polarization component by the polarization beam splitter 105, the components are made incident to O/E converters 106₁ and 106₂ respectively, and the O/E converters 106₁ and 106₂ respectively measure:

$|T_{11}|e^{-j\phi_{11}}$, $|T_{21}|e^{-j\phi_{21}}$

After the above-described measurement, the control unit 109 rotates the output light of the polarization controller 103 by 90°, and makes the light as a linearly polarized wave coincide with an s direction of the polarization beam splitter 105 incident to the optical fiber under test 104. On this occasion, output light from the optical fiber under test 104 is represented by the following equation (7).

$$\begin{bmatrix} |T_{11}|e^{-j\phi_{11}} & |T_{12}|e^{-j\phi_{12}} \\ |T_{21}|e^{-j\phi_{21}} & |T_{22}|e^{-j\phi_{22}} \end{bmatrix} \begin{bmatrix} 0 \\ 1 \end{bmatrix} = \begin{bmatrix} |T_{12}|e^{-j\phi_{12}} & (p\ 成分) \\ |T_{22}|e^{-j\phi_{22}} & (s\ 成分) \end{bmatrix} \quad (7)$$

The above-described output light is split into an s-polarization component and a p-polarization component by the polarization beam splitter 105, the components are made incident to the O/E converters 106₁ and 106₂ respectively, and the O/E converters 106₁ and 106₂ respectively measure:

$|T_{12}|e^{-j\phi_{12}}$, $|T_{22}|e^{-j\phi_{22}}$

A network analyzer 107 obtains the parameters $\theta$, $\psi_1$, and $\psi_2$ from the respective parameters measured as described above, and the equations (3), (4), and (5). It should be noted that the network analyzer 107 controls an intensity modulation ratio in an optical intensity modulator 102 through an amplifier 108.

Then, the above-described measurement is carried out while the output wavelength of a wavelength-variable light source 101 is being swept, thereby obtaining $\theta(\omega)$, $\psi_1(\omega)$, and $\psi_2(\omega)$ from the respective measurement results. Then, the control unit 109 obtains the polarization mode dispersion $\tau_{PMD}$ from the equation (1).

However, in the above-described method, it is necessary to cause the control unit 109 to switch the direction of the output light of the polarization controller 103 either to the p direction or the s direction of the polarization beam splitter 105. It is necessary to carry out the switching of the direction of the output light of the polarization controller 103 for each wavelength sweep of the wavelength-variable light source 101. Consequently, it takes a long period to measure the polarization mode dispersion $\tau_{PMD}$.

In view of the foregoing, an object of the present invention is to provide a polarization mode dispersion measuring device and the like which reduce the time period required to measure the polarization mode dispersion $\tau_{PMD}$.

DISCLOSURE OF INVENTION

According to an aspect of the present invention, a polarization mode dispersion measuring device for measuring polarization mode dispersion of a device under test includes: a polarization separating unit for receiving light having emitted from the device under test, separating the received light into p-polarized light and s-polarized light, and outputting the p-polarized light and s-polarized light; a light generating unit for generating first incident light and second incident light both having a common wavelength; a first optical modulation unit applying intensity modulation with a first intensity modulation frequency to the first incident light, and emitting the modulated light; a second optical modulation unit for applying intensity modulation with a second intensity modulation frequency different from the first intensity modulation frequency to the second incident light, and emitting the modulated light; a polarization combining unit for combining the first incident light and the second incident light having been applied with the intensity modulation, and emitting combined incident light; a light input unit for making the combined incident light incident to the device under test wherein the first incident light is in line with a p-polarization axis in the polarization separating unit, and the second incident light is in line with an s polarization axis in the polarization separating unit; a first measuring unit for measuring phase shift equivalent values of a component of the first incident light in the output of the polarization separating unit; a second measuring unit for measuring phase shift equivalent values of a component of the second incident light in the output of the polarization separating unit; and a polarization mode dispersion measuring unit for measuring a polarization mode dispersion of the device under test based on measurement results of the first measuring unit and the second measuring unit.

According to the polarization mode dispersion measuring device constituted as described above, the light input means makes the combined incident light incident to the device under test where the first incident light is in line with the p-polarization axis in the polarization separating means. Consequently, the phase shift equivalent values of the first incident light component in the output of the polarization separating means measured by the first measuring means are phase shift equivalent values on the first column where a transfer function matrix of the device under test is a 2×2 matrix.

In addition, the light input means makes the combined incident light incident to the device under test where the second incident light is in line with the s-polarization axis in the polarization separating means. Consequently, the phase shift equivalent values of the second incident light component in the output of the polarization separating means measured by the second measuring means are phase shift equivalent values on the second column where the transfer function matrix of the device under test is a 2×2 matrix.

Consequently, it is possible to obtain the phase shift equivalent values of respective elements of the transfer function matrix of the device under test using the first measuring means and the second measuring means. Then, a difference component $\phi(\omega)$ and an in-phase component $\psi(\omega)$ of two orthogonal phase shift components are obtained from the phase shift equivalent values of the respective elements of the transfer function matrix of the device under test. Further, the polarization mode dispersion of the device under test is obtained based on the $\phi(\omega)$ and the $\psi(\omega)$.

In this case, it is not necessary to switch the setting for the direction of the light emitted by the light inputting means, and the fixed setting can be maintained. Consequently, it is possible to provide a polarization mode dispersion measuring device which reduces a time period required to measure the polarization mode dispersion $\tau_{PMD}$.

In accordance with another aspect of the present invention, the phase shift equivalent value is obtained by differentiating a phase shift by an optical angular frequency.

In accordance with another aspect of the present invention, the wavelength of the first incident light and the second incident light is variable, and wherein the first measuring unit further measures amplitude equivalent values of the first incident light component in the output of the polarization separating unit.

According to the polarization mode dispersion measuring device constituted as described above, the first measuring means further measures the amplitude equivalent values of the first incident light component in the output of the polarization separating means. Then, the polarization angle of the light emitted from the device under test can be obtained based on the amplitude equivalent values of the first incident light component, and the wavelength of the first incident light and second incident light.

In accordance with another aspect of the present invention, the wavelength of the first incident light and the second incident light is variable, and wherein the second measuring unit further measures amplitude equivalent values of the second incident light component in the output of the polarization separating unit.

In accordance with another aspect of the present invention, the wavelength of the first incident light and the second incident light is variable, wherein the first measuring unit further measures amplitude equivalent values of the first incident light component in the output of the polarization separating unit, and wherein the second measuring unit further measures amplitude equivalent values of the second incident light component in the output of the polarization separating unit.

According to the polarization mode dispersion measuring device constituted as described above, the polarization angle of the device under test can be measured based on the amplitude equivalent values of the first incident light component, and the wavelength of the first incident light and second incident light. Additionally, the polarization angle of the device under test can be measured based on the amplitude equivalent values of the second incident light component, and the wavelength of the first incident light and second incident light. Consequently, it is possible to increase the measurement accuracy of the polarization angle by averaging the polarization angle obtained based on the amplitude equivalent values of the first incident light component, and the polarization angle obtained based on the amplitude equivalent values of the second incident light component, for example.

In accordance with another aspect of the present invention, the polarization mode dispersion measuring unit measures a group delay of the device under test based on the measurement results of the first measuring unit and the second measuring unit.

The group delays of the device under test can be measured based on derivatives obtained by differentiating the phase shift of the respective elements of the transfer function matrix of the device under test by the optical angular frequency.

In accordance with another aspect of the present invention, the amplitude equivalent value is the square of an amplitude.

In accordance with another aspect of the present invention, the light generating unit includes: a single light source; and a light branching unit for generating the first incident light and the second incident light by branching light generated by the light source.

In accordance with another aspect of the present invention, the polarization mode dispersion measuring device further includes: a first optical/electrical converting unit for applying optical/electrical-conversion to a p-polarization component in the output of the polarization separating unit, and outputting the converted p-polarization component to the first measuring unit and the second measuring unit; and a second optical/electrical converting unit for applying optical/electrical-conversion to an s-polarization component in the output of the polarization separating unit, and outputting the converted s-polarization component to the first measuring unit and the second measuring unit.

In accordance with another aspect of the present invention, a polarization mode dispersion measuring method for measuring polarization mode dispersion of a device under test includes: a polarization separating step for receiving light having emitted from the device under test, separating the received light into p-polarized light and s-polarized light, and outputting the p-polarized light and s-polarized light; a light generating step for generating first incident light and second incident light both having a common wavelength; a first optical modulation step applying intensity modulation with a first intensity modulation frequency to the first incident light, and emitting the modulated light; a second optical modulation step for applying intensity modulation with a second intensity modulation frequency different from the first intensity modulation frequency to the second incident light, and emitting the modulated light; a polarization combining step for combining the first incident light and the second incident light having been applied with the intensity modulation, and emitting combined incident light; a light input step for making the combined incident light incident to the device under test wherein the first incident light is in line with a p-polarization axis in the polarization separating step, and the second incident light is in line with an s polarization axis in the polarization separating step; a first measuring step for measuring phase shift equivalent values of a component of the first incident light in the output of the polarization separating step; a second measuring step for measuring phase shift equivalent values of a component of the second incident light in the output of the polarization separating step; and a polarization mode dispersion measuring step for measuring a polarization mode dispersion of the device under test based on measurement results of the first measuring step and the second measuring step.

In accordance with another aspect of the present invention, provided is a computer-readable medium having a program of instructions for execution by the computer to perform a process for measuring polarization mode dispersion of a device under test by a polarization mode dispersion measuring device having: a polarization separating unit for receiving light having emitted from the device under test, separating the received light into p-polarized light and s-polarized light, and outputting the p-polarized light and s-polarized light; a light generating unit for generating first incident light and second incident light both having a common wavelength; a first optical modulation unit applying intensity modulation with a first intensity modulation frequency to the first incident light, and emitting the modulated light; a second optical modulation unit for applying intensity modulation with a second intensity modulation frequency different from the first intensity modulation frequency to the second incident light, and emitting the modulated light; a polarization combining unit for combining the first incident light and the second incident light having been applied with the intensity modulation, and emitting combined incident light; a light input unit for making the combined incident light incident to the device under test wherein the first incident light is in line with a p-polarization axis in the polarization separating unit, and the second incident light is in line with an s polarization axis in the polarization separating unit; a first measuring unit for measuring phase shift equivalent values of a component of the first incident light in the output of the polarization separating unit; a second measuring unit for measuring phase shift equivalent values of a component of the second incident light in the output of the polarization separating unit; the process including a polarization mode dispersion measuring step for measuring a polarization mode dispersion of the device under test based on measurement results of the first measuring unit and the second measuring unit.

BEST MODE FOR CARRYING OUT THE INVENTION

Description will now be given of embodiments of the present invention with reference to drawings.

Figure 1:
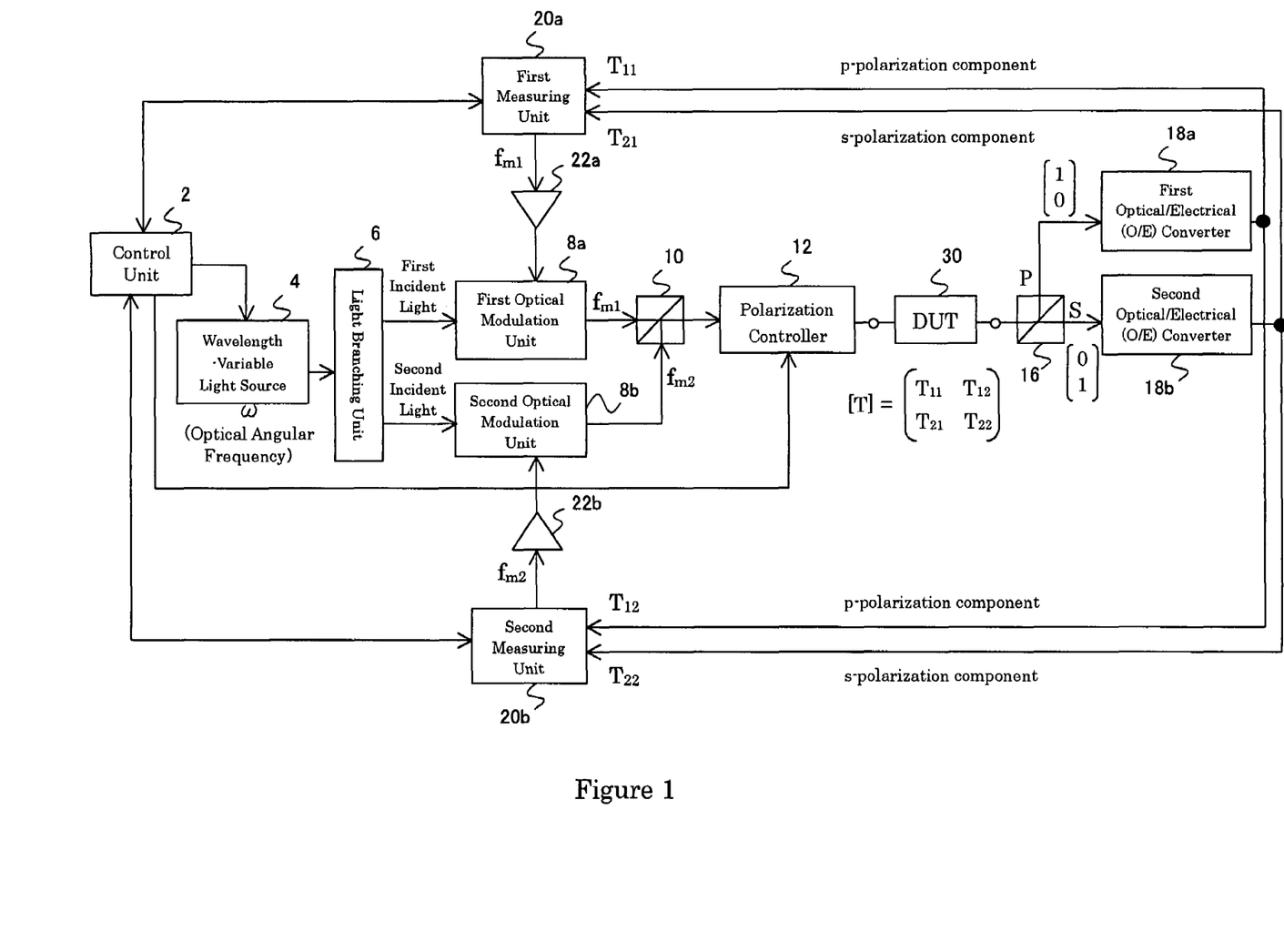
FIG. 1 is a block diagram showing the constitution of a polarization mode dispersion measuring device according to an embodiment of the present invention.

FIG. 1 is a block diagram showing the constitution of a polarization mode dispersion measuring device according to an embodiment of the present invention. The polarization mode dispersion measuring device according to the embodiment of the present invention is intended for obtaining a polarization mode dispersion $\tau_{PMD}$ of a device under test (DUT) 30. The polarization mode dispersion measuring device according to the embodiment of the present invention is provided with a control unit (polarization mode dispersion measuring means) 2, a wavelength-variable light source 4, a light branching unit 6, a first optical modulation unit 8a, a second optical modulation unit 8b, a polarization combiner 10, a polarization controller (light input means) 12, a polarization separator 16, a first optical/electrical (O/E) converter 18a, a second optical/electrical (O/E) converter 18b, a first measuring unit 20a, a second measuring unit 20b, and amplifiers 22a and 22b.

The control unit 2 controls the wavelength-variable light source 4 and the polarization controller 12. In addition, the control unit 20 also serves as polarization mode dispersion measuring means for obtaining the polarization mode dispersion $\tau_{TMD}$ of the device under test 30 based on measurement results of the first measuring unit 20a and second measuring unit 20b. Also, the control unit 20 may obtain a group delay $\tau$ of the device under test 30.

The wavelength-variable light source 4 generates light while changing the wavelength under control of the control unit 2. It should be noted that an optical angular frequency $\omega=2\pi f=2\pi c/\lambda$, where c is the velocity of light, and $\lambda$ is its wavelength. Consequently, changing the wavelength $\lambda$ corresponds to changing the optical angular frequency $\omega$.

The light branching unit 6 branches the light emitted from the wavelength-variable light source 4, and respectively emits first incident light to the first optical modulation unit 8a, and second incident light to the second optical modulation unit 8b. It should be noted that since both the first incident light and the second incident light are emitted from the wavelength-variable light source 4, they have the common wavelength. Consequently, they have the common optical angular frequency $\omega$. The wavelength-variable light source 4 and the light branching unit 6 correspond to light generating means.

The first optical modulation unit 8a carries out intensity modulation for the first incident light. Namely, the first incident light is applied with the intensity modulation such that the intensity thereof becomes a sinusoidal wave having a fixed first intensity modulation frequency fm1, which is approximately several GHz, and is emitted to the polarization combiner 10.

The second optical modulation unit 8b carries out intensity modulation for the second incident light. Namely, the second incident light is applied with the intensity modulation such that the intensity thereof becomes a sinusoidal wave having a fixed second intensity modulation frequency fm2, which is approximately several GHz, and is emitted to the polarization combiner 10. It should be noted that the second intensity modulation frequency fm2 is different from the first intensity modulation frequency fm1.

The polarization combiner 10 combines the emission light of the first modulation unit 8a and the emission light of the second modulation unit 8b, and emits combined incident light.

The polarization controller (light input means) 12 controls a polarization state of the combined incident light according to control by the control unit 2. Namely, the first incident light is made in line with a p-polarization axis in the polarization separator 16, and the second incident light is made in line with an s-polarization axis in the polarization separator 16. Then, the combined incident light whose polarization state is controlled is made incident to the device under test 30.

When the combined incident light is made incident to the device under test 30, the combined incident light passes through the device under test 30. The polarization separator 16 receives the light which has passed through the device under test 30, namely the light emitted from the device under test 30, separates the light into p-polarized light and s-polarized light, and outputs the polarized light.

The first optical/electrical (O/E) converter 18a applies optical/electrical conversion to the p-polarization component in the output of the polarization separator 16, and outputs the converted component to the first measuring unit 20a and the second measuring unit 20b. The second optical/electrical (O/E) converter 18b applies optical/electrical conversion to the s-polarization component in the output of the polarization separator 16, and outputs the converted component to the first measuring unit 20a and the second measuring unit 20b.

The first measuring unit 20a measures phase shift equivalent values and amplitude equivalent values of a first incident light component in the output of the polarization separator 16. The phase shift equivalent value is a value corresponding to the phase shift. Thought the phase shift equivalent value may be the phase shift itself, a value obtained by differentiating the phase shift by the optical angular frequency is the phase shift equivalent value, for example. The amplitude equivalent value is a value corresponding to the amplitude. Though the amplitude equivalent value may be the amplitude itself, a value obtained by squaring the amplitude is the amplitude equivalent value, for example.

In addition, the first measuring unit 20a controls an intensity modulation ratio in the first optical modulation unit 8a through the amplifier 22a. It should be noted that, for obtaining an accurate polarization mode dispersion $\tau_{PMD}$, the first measuring unit 20a stores values measured in advance for the s-polarization component and p-polarization component of the output light for respective wavelengths of the wavelength-variable light source 4, which has not passed thorough the device under test 30, and calibrates the output values of the first optical/electrical (O/E) converter 18a and second optical/electrical (O/E) converter 18b based on these stored values, thereby increasing the measurement accuracy.

The second measuring unit 20b measures phase shift equivalent values and amplitude equivalent values of a second incident light component in the output of the polarization separator 16. The phase shift equivalent value is a value corresponding to the phase shift. For example, a value obtained by differentiating the phase shift by the optical angular frequency is the phase shift equivalent value. The amplitude equivalent value is a value corresponding to the amplitude. For example, a value obtained by squaring the amplitude is the amplitude equivalent value.

In addition, the second measuring unit 20b controls an intensity modulation ratio in the second optical modulation unit 8b through the amplifier 22b. It should be noted that, for obtaining an accurate polarization mode dispersion $\tau_{PMD}$, the second measuring unit 20b stores values measured in advance for the s-polarization component and p-polarization component of the output light for the respective wavelengths of the wavelength-variable light source 4, which has not passed thorough the device under test 30, and calibrates the output values of the first optical/electrical (O/E) converter 18a and second optical/electrical (O/E) converter 18b based on these stored values so as to obtain the polarization mode dispersion $\tau_{PMD}$, thereby increasing the measurement accuracy.

A description will now be given of an operation of the polarization mode dispersion measuring device according to the embodiment of the present invention with reference to a flowchart in FIG. 2.

First, the optical angular frequency of the light output by the wavelength-variable light source 4 is set to ω (S10). With reference to FIG. 1, the wavelength-variable light source 4 emits the light having the optical angular frequency ω. This light is branched into the first incident light and the second incident light by the light branching unit 6. The first incident light is applied with the intensity modulation with the first intensity modulation frequency fm1 by the first optical modulation unit 8a, and is emitted to the polarization combiner 10. The second incident light is applied with the intensity modulation with the second intensity modulation frequency fm2 by the second optical modulation unit 8b, and is emitted to the polarization combiner 10.

The polarization combiner 10 combines the first incident light and second incident light which has been applied with the intensity modulation, and emits the combined incident light. As for the combined incident light, the first incident light is made in line with the p-polarization axis in the polarization separator 16, and the second incident light is made in line with the s-polarization axis in the polarization separator 16 respectively by the polarization controller light input means) 12. Then, the combined incident light is made incident to the device under test 30.

The combined incident light having passed through the device under test 30 is separated into the p-polarized light and s-polarized light by the polarization separator 16. The p-polarization component output by the polarization separator 16 is applied with the optical/electrical conversion by the first optical/electrical (O/E) converter 18a, and is output to the first measuring unit 20a and the second measuring unit 20b. The s-polarization component output by the polarization separator 16 is applied with the optical/electrical conversion by the second optical/electrical (O/E) converter 18b, and is output to the first measuring unit 20a and the second measuring unit 20b.

Figure 2:
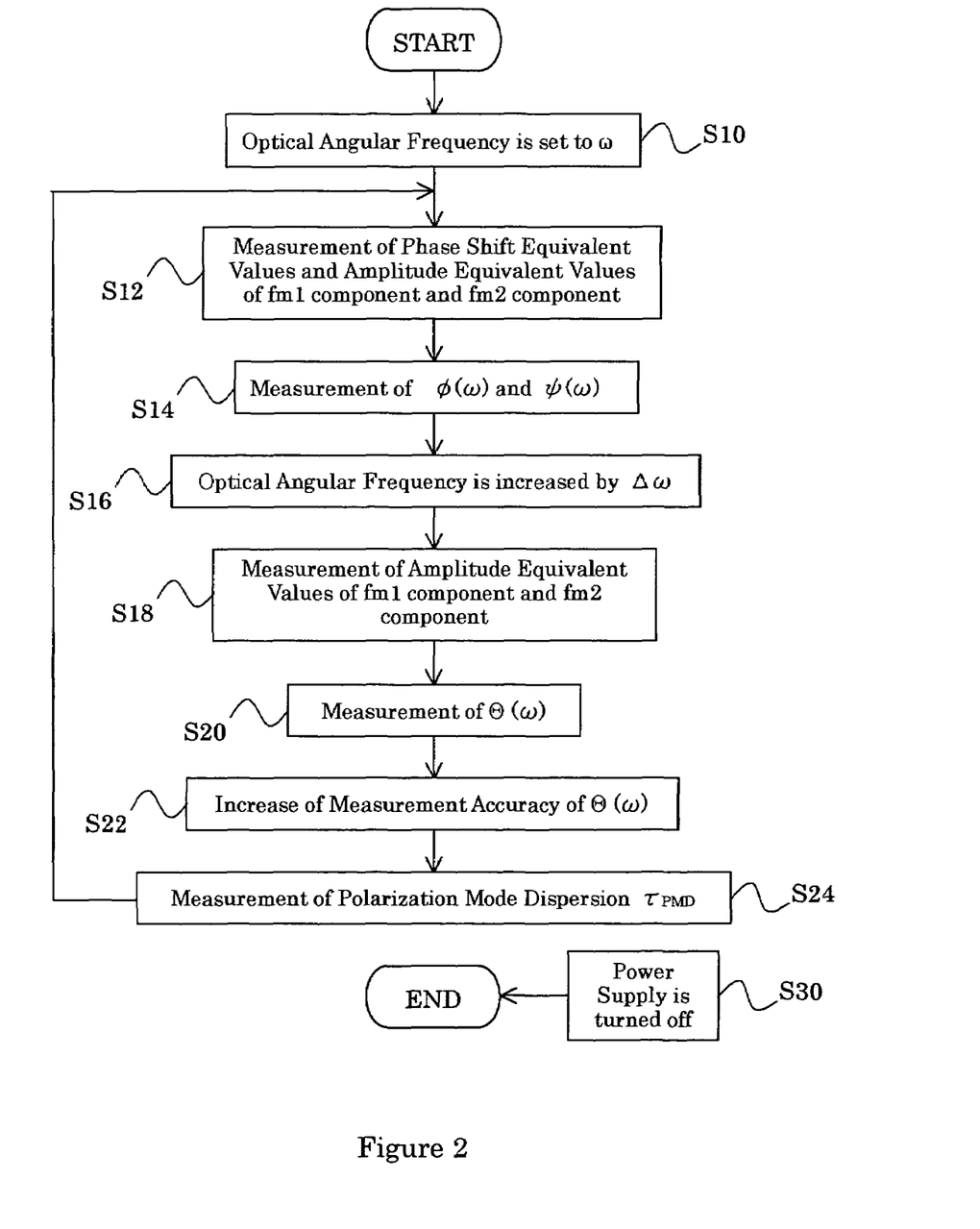
FIG. 2 is a flowchart showing an operation of the polarization mode dispersion measuring device according to the embodiment of the present invention.

The first measuring unit 20a and second measuring unit 20b obtain the phase shift equivalent values and the amplitude equivalent values of the first incident light component (referred to as "fm1 component") and the second incident light component (referred to as "fm2 component") based on the outputs of the first optical/electrical (O/E) converter 18a and second optical/electrical (O/E) converter 18b (S12) (see FIG. 2).

A description will now be given of how to obtain the phase shift equivalent values and how to obtain the amplitude equivalent values (S12).

First, a transfer function matrix [T] of the device under test 30 is defined by the following equation (10):

$$[T(\omega)] = \begin{bmatrix} T_{11}(\omega) & T_{12}(\omega) \\ T_{21}(\omega) & T_{22}(\omega) \end{bmatrix} \quad (10)$$

It should be noted that respective elements of the transfer function matrix [T] is represented by the following equations (11):

$$T_{11}(\omega) = \cos\Theta(\omega) e^{-j(\Phi+\phi+\psi)} = \cos\Theta(\omega) e^{-j\Phi_{11}}$$

$$T_{12}(\omega) = -\sin\Theta(\omega) e^{-j(\Phi+\phi-\psi)} = -\sin\Theta(\omega) e^{-j\Phi_{12}}$$

$$T_{21}(\omega) = \sin\Theta(\omega) e^{-j(\Phi-\phi+\psi)} = \sin\Theta(\omega) e^{-j\Phi_{21}}$$

$$T_{22}(\omega) = \cos\Theta(\omega) e^{-j(\Phi-\phi-\psi)} = \cos\Theta(\omega) e^{-j\Phi_{22}} \quad (11)$$

where $\phi(\omega)$ is a difference component of two orthogonal phase shift components $\psi_1(\omega)$ and $\psi_2(\omega)$, and $\psi(\omega)$ is an in-phase component of the two orthogonal phase shift components $\psi_1(\omega)$ and $\psi_2(\omega)$. It should be noted that $\psi_1(\omega)$ is a phase shift in a certain direction on a plane perpendicular to the propagating direction of the light, and $\psi_2(\omega)$ is a phase shift in a direction orthogonal to $\psi_1$. Specifically, $\phi(\omega)=(\psi_1(\omega)-\psi_2(\omega))/2$, and $\psi(\omega)=(\psi_1(\omega)+\psi_2(\omega))/2$. In addition $\Theta(\omega)$ is the polarization angle of the light emitted from the device under test 30.

On this occasion, as for the polarization state of the combined incident light, the first incident light is made in line with the p-polarization axis in the polarization separator 16. Consequently, the fm1 component output of the polarization separator 16 is represented by the following equation (12):

$$\begin{bmatrix} T_{11}(\omega) & T_{12}(\omega) \\ T_{21}(\omega) & T_{22}(\omega) \end{bmatrix} \begin{bmatrix} 1 \\ 0 \end{bmatrix} = \begin{bmatrix} T_{11}(\omega) \\ T_{21}(\omega) \end{bmatrix} \begin{matrix} p\,成分 \\ s\,成分 \end{matrix} \quad fm1\,成分 \quad (12)$$

The fm1 component output is measured by the first measuring unit 20a. The light corresponding to $T_{11}(\omega)$ is input to the first measuring unit 20a through the first optical/electrical (O/E) converter 18a. In addition, the light corresponding to $T_{21}(\omega)$ is input to the first measuring unit 20a through the second optical/electrical (O/E) converter 18b. Consequently, the first measuring unit 20a can measure the values corresponding to the phase shifts $\Phi_{11}$ and $\Phi_{21}$ of the $T_{11}(\omega)$ and $T_{21}(\omega)$ respectively such as the values obtained by respectively differentiating the phase shifts $\Phi_{11}$ and $\Phi_{21}$ by the optical angular frequency $\omega$, and the values corresponding to the amplitudes $|T_{11}(\omega)|$ and $|T_{21}(\omega)|$ respectively such as the values obtained by respectively squaring the amplitudes $|T_{11}(\omega)|$ and $|T_{21}(\omega)|$. Namely, the first measuring unit 20a can measure the phase shift equivalent values and the amplitude equivalent values on the first column of the transfer function matrix of the device under test 30.

In addition, as for the polarization state of the combined incident light, the second incident light is made in line with the s-polarization axis in the polarization separator 16. Consequently, the fm2 component output of the polarization separator 16 is represented by the following equation (13):

$$\begin{bmatrix} T_{11}(\omega) & T_{12}(\omega) \\ T_{21}(\omega) & T_{22}(\omega) \end{bmatrix} \begin{bmatrix} 0 \\ 1 \end{bmatrix} = \begin{bmatrix} T_{12}(\omega) \\ T_{22}(\omega) \end{bmatrix} \begin{matrix} p\,成分 \\ s\,成分 \end{matrix} \quad fm2\,成分 \quad (13)$$

The fm2 component output is measured by the second measuring unit 20b. Consequently, the light corresponding to $T_{12}(\omega)$ is input to the second measuring unit 20b through the first optical/electrical (O/E) converter 18a. In addition, the light corresponding to $T_{22}(\omega)$ is input to the second measuring unit 20b through the second optical/electrical (O/E) converter 18b. Consequently, the second measuring unit 20b can measure the values corresponding to the phase shifts $\Phi_{12}$ and $\Phi_{22}$ of the $T_{12}(\omega)$ and $T_{22}(\omega)$ respectively such as the values obtained by respectively differentiating the phase shifts $\Phi_{12}$ and $\Phi_{22}$ by the optical angular frequency $\omega$, and the values corresponding to the amplitudes $|T_{12}(\omega)|$ and $|T_{22}(\omega)|$ respectively such as the values obtained by respectively squaring the amplitudes $|T_{12}(\omega)|$ and $|T_{22}(\omega)|$. Namely, the second measuring unit 20b can measure the phase shift equivalent values and the amplitude equivalent values on the second column of the transfer function matrix of the device under test 30.

Consequently, the values equivalent to the phase shifts $\Phi_{11}$, $\Phi_{21}$, $\Phi_{12}$, and $\Phi_{22}$ (values obtained by differentiating the phase shifts by the optical angular frequency $\omega$, and the values equivalent to the amplitudes $|T_{11}(\omega)|$, $|T_{21}(\omega)|$, $|T_{12}(\omega)|$, and $|T_{22}(\omega)|$ (values obtained by squaring the amplitudes) of the device under test 30 can be measured.

Then, the control unit 2 obtains $\phi(\omega)$ and $\psi(\omega)$ based on the values equivalent to the phase shifts $\Phi_{11}$, $\Phi_{21}$, $\Phi_{12}$, and $\Phi_{22}$ (values obtained by differentiating the phase shifts by optical angular frequency $\omega$) of the device under test 30 (S14).

First, group delays are obtained by differentiating the phase shifts $\Phi_{11}$, $\Phi_{21}$, $\Phi_{12}$, and $\Phi_{22}$ by optical angular frequency. The group delays are represented by the following equations (14).

$$\tau_{11} = \frac{d\Phi_{11}}{d\omega} = \dot{\Phi}_{11} = \dot{\Phi} + \dot{\phi} + \dot{\psi} \quad (14)$$

$$\tau_{12} = \frac{d\Phi_{12}}{d\omega} = \dot{\Phi}_{12} = \dot{\Phi} + \dot{\phi} - \dot{\psi}$$

$$\tau_{21} = \frac{d\Phi_{21}}{d\omega} = \dot{\Phi}_{21} = \dot{\Phi} - \dot{\phi} + \dot{\psi}$$

$$\tau_{22} = \frac{d\Phi_{22}}{d\omega} = \dot{\Phi}_{22} = \dot{\Phi} - \dot{\phi} - \dot{\psi}$$

When $\phi(\omega)$ and $\psi(\omega)$ are applied with Taylor series expansion, and then are applied with first-order approximation, the results are expressed by the following equations (15):

$$\phi(\omega)=\phi_0+\beta_1(\omega-\omega_0),\ \psi(\omega)=\psi_0+\gamma_1(\omega-\omega_0) \quad (15)$$

where $\beta_1$ is obtained by differentiating $\phi(\omega)$ by $\omega$, and $\gamma_1$ is obtained by differentiating $\psi(\omega)$ by $\omega$. Consequently, $\beta_1$ and $\gamma_1$ are obtained by the following equations (16):

$$\beta_1 = \dot{\phi} = \frac{1}{4}(\tau_{11} - \tau_{22} - \tau_{21} + \tau_{12}) \quad (16)$$

$$\gamma_1 = \dot{\psi} = \frac{1}{4}(\tau_{11} - \tau_{22} + \tau_{21} - \tau_{12})$$

When $\beta_1$ and $\gamma_1$ have been obtained, $\phi(\omega)$ and $\psi(\omega)$ are obtained by assigning $\beta_1$ and $\gamma_1$ to the equations (15).

Then, the control unit 2 controls the wavelength-variable light source 4 to increase the optical angular frequency by $\Delta\omega$ (S16). On this occasion, the optical angular frequency is $\omega+\Delta\omega$. Then, the amplitudes of the fm1 component and the fm2 component are obtained (S18). The method for measuring the amplitudes is similar to the measurement of the amplitudes (S12) when the optical angular frequency is $\omega$.

Then, the control unit 2 measures $\Theta(\omega)$ using the amplitudes when optical angular frequency is $\omega$, and the amplitudes when the optical angular frequency is $\omega+\Delta\omega$ (S20). It should be noted that $\Theta(\omega)$ is the polarization angle of the light emitted from the device under test 30.

First, $\Theta(\omega)$ is obtained using the equivalent values of $|T_{11}(\omega)|$ and $|T_{21}(\omega)|$ (values obtained by squaring the amplitudes) obtained by the first measuring unit 20a as shown by the following equation (17):

$$\Theta(\omega) = 0.5\ \cos^{-1}(|T_{11}(\omega)|^2 - |T_{21}(\omega)|^2) \quad (17)$$

In addition, $\Theta(\omega+\Delta\omega)$ is obtained using the equivalent values of $|T_{11}(\omega+\Delta\omega)|$ and $|T_{21}(\omega+\Delta\omega)|$ (values obtained by squaring the amplitudes) as shown by the following equation (18):

$$\Theta(\omega+\Delta\omega) = 0.5\ \cos^{-1}(|T_{11}(\omega+\Delta\omega)|^2 - |T_{21}(\omega+\Delta\omega)|^2) \quad (18)$$

When $\Theta(\omega)$ is applied with Taylor series expansion, and then is applied with first-order approximation, the result is expressed by the following equation (19):

$$\Theta(\omega) = \Theta_0 + \alpha_1(\omega - \omega_0) \quad (19)$$

Consequently, $\alpha_1$ is obtained as shown by the following equation (20).

$$\alpha_1 = (\Theta(\omega+\Delta\omega) - \Theta(\omega))/((\omega+\Delta\omega) - \omega) \quad (20)$$

$\Theta(\omega)$ is obtained by assigning $\alpha_1$ to the equation (19). Namely, $\Theta(\omega)$ is obtained based on the values equivalent to the amplitudes $|T_{11}(\omega)|$ and $|T_{21}(\omega)|$ (values obtained by squaring amplitudes) and the optical angular frequencies such as $\omega+\Delta\omega$ and $\omega$. It should be noted that since the optical angular frequency has a constant relationship with the wavelength, $\Theta(\omega)$ is obtained based on the amplitudes equivalent values and the wavelength.

Then, $(\omega)$ is obtained using the equivalent values of $|T_{12}(\omega)|$ and $|T_{22}(\omega)|$ (values obtained by squaring the amplitudes) obtained by the second measuring unit 20b as shown by the following equation (21):

$$\Theta(\omega) = 0.5\ \cos^{-1}(|T_{12}(\omega)|^2 - |T_{22}(\omega)|^2) \quad (21)$$

In addition, $\Theta(\omega+\Delta\omega)$ is obtained using the equivalent values of $|T_{12}(\omega+\Delta\omega)|$ and $|T_{22}(\omega+\Delta\omega)|$ (values obtained by squaring the amplitudes) as shown by the following equation (22):

$$\Theta(\omega+\Delta\omega) = 0.5\ \cos^{-1}(|T_{12}(\omega+\Delta\omega)|^2 - |T_{22}(\omega+\Delta\omega)|^2) \quad (22)$$

Then, $\alpha_1$ is obtained using the equation (20). $\Theta(\omega)$ is obtained by assigning $\alpha_1$ to the equation (19). Namely, $\Theta(\omega)$ is obtained based on the values equivalent to the amplitudes $|T_{12}(\omega)|$ and $|T_{22}(\omega)|$ (values obtained by squaring amplitudes) and the optical angular frequencies such as $\omega+\Delta\omega$ and $\omega$. It should be noted that since the optical angular frequency has a constant relationship with the wavelength, $\Theta(\omega)$ is obtained based on the values equivalent to the amplitudes (values obtained by squaring the amplitudes) and the wavelength.

In this way, $\Theta(\omega)$ is obtained based on the values equivalent to the amplitudes $|T_{11}(\omega)|$ and $|T_{21}(\omega)|$ (values obtained by squaring amplitudes) obtained by the first measuring unit 20a, and $\Theta(\omega)$ is obtained based on the values equivalent to the amplitudes $|T_{12}(\omega)|$ and $|T_{22}(\omega)|$ (values obtained by squaring amplitudes) obtained by the second measuring unit 20b.

Then, the control unit 2 obtains $\Theta(\omega)$ by increasing the measurement accuracy by averaging $\Theta(\omega)$ obtained based on the values which are the squared $|T_{11}(\omega)|$ and $|T_{21}(\omega)|$, and $\Theta(\omega)$ obtained based on the values which are the squared $|T_{12}(\omega)|$ and $|T_{22}(\omega)|$, for example (S22). Then, the procedure returns to the measurement (S12) of the phase shift equivalent values of the fm1 component and fm2 component, and the amplitude equivalent values of the fm1 component and fm2 component. It should be noted that since the amplitude equivalent values for the optical angular frequency $\omega+\Delta\omega$ have been obtained in the S18, the measurement of the amplitude equivalent values in the S12 may be omitted. Then, the controller unit 2 obtains the polarization mode dispersion $\tau_{PMD}$ of the device under test 30 based on the equation (23) using first order coefficients $\alpha_1$, $\beta_1$, and $\gamma_1$ of the Taylor series expansions of $\Theta(\omega)$, $\phi(\omega)$, and $\psi(\omega)$ (S24).

$$\tau_{PMD} = 2\sqrt{\alpha_1^2 + \beta_1^2 + \gamma_1^2 + 2\beta_1\gamma_1\cos 2\Theta} \quad (23)$$

The control unit 2 may obtain the group delay $\tau$ of the device under test 30 as described in the following equation (24) if necessary. It should be noted that any of (a), (b), and ($\omega$) may be used.

$$\begin{aligned}
\tau &= \dot{\Phi} \\
&= \frac{1}{2}(\tau_{11} + \tau_{22})\ (a) \\
&= \frac{1}{2}(\tau_{21} + \tau_{12})\ (b) \\
&= \frac{1}{4}(\tau_{11} + \tau_{22} + \tau_{21} + \tau_{12})\ (c)
\end{aligned} \quad (24)$$

Then, the procedure is terminated by turning off a power supply at arbitrary timing (S30).

According to the embodiment of the present invention, the polarization controller (light input means) 12 makes the first incident light in line with the p-polarization axis in the polarization separator 16, and makes the combined incident light incident to the device under test 30. Consequently, when the transfer function matrix of the device under test is 2×2 matrix, the phase shift equivalent values and amplitude equivalent values of the first incident light component in the output of the polarization separator 16 measured by the first measuring unit 20a are the values corresponding to the phase shifts $\Phi_{11}$ and $\Phi_{21}$ of $T_{11}$ and $T_{21}$ respectively on the first column such as the values obtained by respectively differentiating the phase shifts $\Phi_{11}$ and $\Phi_{21}$ by the optical angular frequency $\omega$, and the values corresponding to the amplitudes $|T_{11}(\omega)|$ and $|T_{21}(\omega)|$ such as the values obtained by squaring the amplitudes $|T_{11}(\omega)|$ and $|T_{21}(\omega)|$.

In addition, the polarization controller (light input means) 12 makes the second incident light in line with the s-polarization axis in the polarization separator 16, and makes the combined incident light incident to the device under test 30. Consequently, when the transfer function matrix of the device under test is a 2×2 matrix, the phase shift and amplitude of the second incident light component in the output of the polarization separator 16 measured by the second measuring unit 20b are the values corresponding to the phase shifts $\Phi_{12}$ and $\Phi_{22}$ of $T_{12}$ and $T_{22}$ respectively on the second column such as the values obtained by respectively differentiating the phase shifts $\Phi_{12}$ and $\Phi_{22}$ by the optical angular frequency ω, and the values corresponding to the amplitudes $|T_{12}(\omega)|$ and $|T_{22}(\omega)|$ such as the values obtained by squaring the amplitudes $|T_{12}(\omega)|$ and $|T_{22}(\omega)|$.

Consequently, the phase shift equivalent values and the amplitude equivalent values of the respective elements of the transfer function matrix of the device under test 30 can be obtained by the first measuring unit 20a and the second measuring unit 20b. It is possible to obtain the difference component $\phi(\omega)$ and the in-phase component $\psi(\omega)$ of the two orthogonal phase shift components from the phase shift equivalent values of the respective elements of the transfer function matrix of the device under test 30. In addition, it is possible to obtain the polarization angle $\Phi(\omega)$ from the amplitude equivalent values of the respective elements of the transfer function matrix of the device under test 30.

Further, it is possible to obtain the polarization mode dispersion $\tau_{PMD}$ of the device under test 30 using the first order coefficients $\alpha_1$, $\beta_1$, and $\gamma_1$ of the Taylor series expansions of $\Phi(\omega)$, $\phi(\omega)$, and $\psi(\omega)$.

In this case, it is not necessary to switch the setting for the direction of the light emitted by polarization controller (light input means) 12, and the fixed setting can be maintained. Consequently, it is possible to provide a polarization mode dispersion measuring device which reduces the time period required to measure the polarization mode dispersion $\tau_{PMD}$.

Further, it is possible to measure the polarization angle $\Phi(\omega)$ of the device under test 30 based on the amplitude equivalent values of the first incident light component, and the wavelength (optical angular frequency) of the first incident light and second incident light. Furthermore, it is possible to measure the polarization angle $\Phi(\omega)$ of the device under test 30 based on the amplitude equivalent values of the second incident light component, and the wavelength of the first incident light and second incident light. Consequently, it is possible to increase the measurement accuracy of the polarization angle $\Phi(\omega)$ by averaging the polarization angle obtained based on the amplitude equivalent values of the first incident light component, and the polarization angle obtained based on the amplitude equivalent values of the second incident light component, for example.

In addition, the above-described embodiment can be realized in the following manner. A computer is provided with a CPU, a hard disk, and a media (such as a floppy disk and a CD-ROM) reader, and the media reader is made to read a medium recording a program realizing the above-described respective parts, especially realizing the calculation of the various parameters such as $\alpha_1$, $\beta_1$, and $\gamma_1$ in the control unit 2, thereby installing the program on the hard disk. This method may realize the above-described functions.

According to the present invention, the light input means makes the combined incident light incident to the device under test where the first incident light is in line with the p-polarization axis in the polarization separating means. Consequently, the phase shift equivalent values of the first incident light component in the output of the polarization separating means measured by the first measuring means are the phase shift equivalent values on the first column when the transfer function matrix of the device under test is a 2×2 matrix.

In addition, the light input means makes the combined incident light incident to the device under test where the second incident light is in line with the s-polarization axis in the polarization separating means. Consequently, the phase shift equivalent values of the second incident light component in the output of the polarization separating means measured by the second measuring means are the phase shift equivalent values on the second column when the transfer function matrix of the device under test is a 2×2 matrix.

Consequently, it is possible to obtain the phase shift equivalent values of the respective elements of the transfer function matrix of the device under test using the first measuring means and second measuring means. It is possible to obtain the difference component $\phi(\omega)$ and in-phase component $\psi(\omega)$ of the two orthogonal phase shift components from the phase shift equivalent values of the respective elements of the transfer function matrix of the device under test. In addition, it is possible to obtain the polarization mode dispersion of the device under test based on $\phi(\omega)$ and $\psi(\omega)$.

In this case, it is not necessary to switch the setting for the direction of the light emitted by the light inputting means, and the fixed setting can be maintained. Consequently, it is possible to provide a polarization mode dispersion measuring device which reduces the time period required to measure the polarization mode dispersion $\tau_{PMD}$.

What is claimed is:

1. A polarization mode dispersion measuring device for measuring polarization mode dispersion of a device under test, said polarization mode dispersion measuring device comprising:

polarization separating means for receiving light having emitted from the device under test, separating said received light into p-polarized light and s-polarized light, and outputting the p-polarized light and s-polarized light;

light generating means for generating first incident light and second incident light both having a common wavelength;

first optical modulation means for applying a first intensity modulation with a first intensity modulation frequency to said first incident light, and emitting first modulated light;

second optical modulation means for applying a second intensity modulation with a second intensity modulation frequency different from said first intensity modulation frequency to said second incident light, and emitting second modulated light;

polarization combining means for combining said first incident light and said second incident light having been applied with the first and second intensity modulations, and emitting combined incident light;

light input means for making said combined incident light incident to the device under test, wherein said first incident light is in line with a p-polarization axis in said polarization separating means, and said second incident light is in line with an s-polarization axis in said polarization separating means;

first measuring means for measuring phase shift equivalent values of a component of said first incident light in the output of said polarization separating means;

second measuring means for measuring phase shift equivalent values of a component of said second incident light in the output of said polarization separating means; and polarization mode dispersion measuring means for measuring a polarization mode dispersion of the device under test based on measurement results of said first measuring means and said second measuring means.

2. The polarization mode dispersion measuring device according to claim 1, wherein said phase shift equivalent value is obtained by differentiating a phase shift by an optical angular frequency.

3. The polarization mode dispersion measuring device according to claim 1,
wherein the wavelength of said first incident light and said second incident light is variable, and
wherein said first measuring means further measures amplitude equivalent values of said first incident light component in the output of said polarization separating means.

4. The polarization mode dispersion measuring device according to claim 3, wherein said amplitude equivalent value is the square of an amplitude.

5. The polarization mode dispersion measuring device according to claim 1,
wherein the wavelength of said first incident light and said second incident light is variable, and
wherein said second measuring means further measures amplitude equivalent values of said second incident light component in the output of said polarization separating means.

6. The polarization mode dispersion measuring device according to claim 1,
wherein the wavelength of said first incident light and said second incident light is variable,
wherein said first measuring means further measures amplitude equivalent values of said first incident light component in the output of said polarization separating means, and
wherein said second measuring means further measures amplitude equivalent values of said second incident light component in the output of said polarization separating means.

7. The polarization mode dispersion measuring device according to claim 1,
wherein said polarization mode dispersion measuring means measures a group delay of the device under test based on the measurement results of said first measuring means and said second measuring means.

8. The polarization mode dispersion measuring device according to claim 1,
wherein said light generating means comprises:
a single light source; and
light branching means for generating said first incident light and said second incident light by branching light generated by said light source.

9. The polarization mode dispersion measuring device according to claim 1, further comprising:
first optical/electrical converting means for applying optical/electrical-conversion to a p-polarization component in the output of said polarization separating means, and outputting the converted p-polarization component to said first measuring means and said second measuring means; and
a second optical/electrical converting means for applying optical/electrical-conversion to an s-polarization component in the output of said polarization separating means, and outputting the converted s-polarization component to said first measuring means and said second measuring means.

10. A polarization mode dispersion measuring method of measuring polarization mode dispersion of a device under test, said method comprising:
a polarization separating step comprising receiving light having emitted from the device under test, separating said received light into p-polarized light and s-polarized light, and outputting the p-polarized light and s-polarized light;
a light generating step comprising generating first incident light and second incident light both having a common wavelength;
a first optical modulation step comprising applying a first intensity modulation with a first intensity modulation frequency to said first incident light, and emitting first modulated light;
a second optical modulation step comprising applying a second intensity modulation with a second intensity modulation frequency different from said first intensity modulation frequency to said second incident light, and emitting second modulated light;
a polarization combining step comprising combining said first incident light and said second incident light having been applied with the first and second intensity modulations, and emitting combined incident light;
a light input step comprising making said combined incident light incident to the device under test wherein said first incident light is in line with a p-polarization axis in said polarization separating step, and said second incident light is in line with an s-polarization axis in said polarization separating step;
a first measuring step comprising measuring phase shift equivalent values of a component of said first incident light in the output of said polarization separating step;
a second measuring step comprising measuring phase shift equivalent values of a component of said second incident light in the output of said polarization separating step; and
a polarization mode dispersion measuring step comprising measuring a polarization mode dispersion of the device under test based on measurement results of said first measuring step and said second measuring step.

11. A computer-readable medium having a program of instructions for execution by a computer to perform a process for measuring polarization mode dispersion of a device under test by a polarization mode dispersion measuring device having:
polarization separating means for receiving light having emitted from the device under test, separating said received light into p-polarized light and s-polarized light, and outputting the p-polarized light and s-polarized light;
light generating means for generating first incident light and second incident light both having a common wavelength;
first optical modulation means for applying a first intensity modulation with a first intensity modulation frequency to said first incident light, and emitting first modulated light;
second optical modulation means for applying a second intensity modulation with a second intensity modulation frequency different from said first intensity modulation frequency to said second incident light, and emitting second modulated light;

polarization combining means for combining said first incident light and said second incident light having been applied with the first and second intensity modulations, and emitting combined incident light;

light input means for making said combined incident light incident to the device under test, wherein said first incident light is in line with a p-polarization axis in said polarization separating means, and said second incident light is in line with an s-polarization axis in said polarization separating means;

first measuring means for measuring phase shift equivalent values of a component of said first incident light in the output of said polarization separating means; and second measuring means for measuring phase shift equivalent values of a component of said second incident light in the output of said polarization separating means;

said process comprising:

a polarization mode dispersion measuring step comprising measuring a polarization mode dispersion of the device under test based on measurement results of said first measuring means and said second measuring means.

* * * * *